United States Patent Office 2,705,122
Patented Mar. 29, 1955

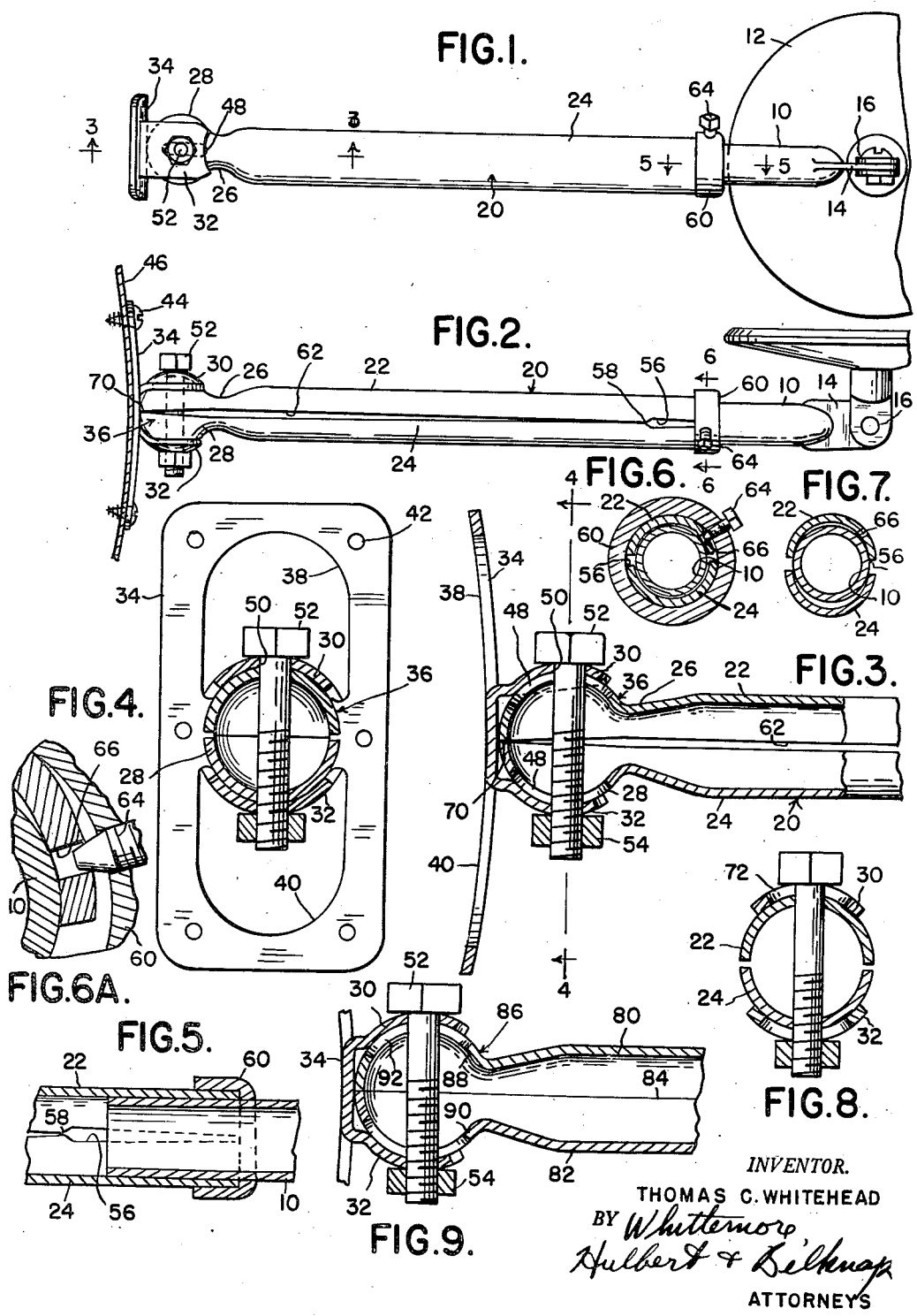

2,705,122

MIRROR SUPPORTING MEANS

Thomas C. Whitehead, Detroit, Mich., assignor to Whitehead Stamping Company, Detroit, Mich., a corporation of Michigan Original application February 25, 1952, Serial No. 273,167. Divided and this application February 16, 1953, Serial No. 336,915

1 Claim. (Cl. 248—286)

The present invention relates to a mirror supporting means and is a division of my prior copending application Serial No. 273,167, filed February 25, 1952, which in turn is a continuation-in-part of my prior copending application Serial No. 645,556, filed February 5, 1946, now Patent No. 2,596,632.

The invention is illustrated as employed in the mounting of rear view mirrors and more particularly of the type employed on commercial vehicles and including a relatively long mirror supporting arm. With such construction the arm is pivotally mounted on the vehicle body so that it may be extended laterally outwardly when in use but is adapted to be arranged in substantially vertical, upwardly extending position when not needed or when the vehicle is parked close to other vehicles in a garage or the like. Friction in the pivotal joint is depended upon to hold the arm in this upright position or in any position of adjustment, and the invention relates particularly to an arrangement in which friction in the joint is maintained throughout a long useful life and will not be diminished by wear or the like.

It is an object of the present invention to provide mirror supporting means comprising an arm formed of two generally semi-cylindrical portions, each of which is provided at one end with cooperating head portions, the edges of said portions at the opposite end being relieved for a short distance inwardly from the end thereof, in combination with a collar having an internal diameter less than the normal external diameter of the arm whereby assembly of the collar on the end of the arm rocks the end portions of the arm toward each other about fulcrums located at the end of the relieved portions of the edges, to thereby separate the head portions of the arms.

It is a further object of the present invention to provide structure of the type defined in the preceding paragraph in combination with an elongated member slidably received within said arm and dimensioned to permit the aforesaid movement of the ends of said portions toward each other, said collar having a radial clamping screw therein to retain the collar in assembled position on the arm and to apply clamping pressure through one of said arm portions to said member.

Other objects and features of the invention will become apparent as the description proceeds, especially when taken in conjunction with the accompanying drawings, wherein:

Figure 1 is a fragmentary rear elevational view of the mirror supporting means.

Figure 2 is a fragmentary plan view of the mirror supporting means with parts in section.

Figure 3 is an enlarged fragmentary sectional view on the line 3—3, Figure 1.

Figure 4 is an enlarged sectional view on the line 4—4, Figure 3.

Figure 5 is an enlarged fragmentary section on the line 5—5, Figure 1.

Figure 6 is an enlarged sectional view on the line 6—6, Figure 2.

Figure 6A is an enlarged fragmentary view of a detail of the structure shown in Figure 6.

Figure 7 is a transverse sectional view illustrating the relationship of parts before assembling the collar over the end of the arm.

Figure 8 is a transverse sectional view through a modification of the invention in which elongated slots are provided in the mounting ears.

Figure 9 is a fragmentary sectional view similar to Figure 3 illustrating another embodiment of the present invention.

The mirror supporting means comprises an elongated cylindrical member 10 carried by the mirror 12 and illustrated as adjustably connected thereto by means of a tongue 14 received between ears 16 on the mirror.

The device comprises a generally tubular mounting arm 20 which is preferably formed of two semi-cylindrical portions 22 and 24, these portions being of semi-cylindrical configuration from the outer end thereof to a reduced neck portion 26 and having beyond the neck portions 26 enlarged head portions 28 which are preferably substantially semi-spherical. The arm 20 formed by the arm portions 22 and 24 is mounted with its head received between mounting ears 30 and 32 carried by a mounting plate or bracket 34. Preferably the ears 30 and 32 are stamped to spherical configuration so as to conform closely to the spherical configuration of the head 36, as best illustrated in Figures 3 and 4.

The mounting bracket or plate 34, as best seen in Figure 4, is formed from a single piece of metal and the ears 30 and 32 thereof are struck out of the material of the plate leaving openings 38 and 40 therein. The plate 34 is apertured as indicated at 42 for the reception of mounting screws 44 which preferably are of the self tapping type whereby the mounting plate or bracket may be secured to the sheet metal body 46 of the vehicle.

As best seen in Figures 1 and 3, the head portions 28 of the arm portions 20 are provided with elongated openings 48 which are disposed diametrically opposite each other on the spherical head 36. The mounting ears 30 and 32 in this embodiment of the invention are provided with openings 50 for the reception of an assembly bolt 52 having a clamping nut 54 associated therewith. The bolt 52 constitutes a pivot connection between the head 36 and the ears 30 and 32 whereby relative rocking motion of the arm 20 may take place about the axis of the bolt 52. However, the elongated slots 48 also permit relative movement between the arm 20 and the bracket 34 in a direction at right angles to the axis of the bolt 52.

Adjacent the outer end of the arm 20 the edges of the arm portions 22 and 24 are relieved as indicated at 56, thereby leaving fulcrum points 58 for a purpose which will now be described.

As best seen in Figure 7, the member 10 is of an external transverse dimension sufficiently smaller than the normal internal transverse dimension of the arm 20 so as to permit the ends of the arm portions 22 and 24 to move relatively toward each other as permitted by the clearance provided by the relief 56 at the ends of the arm portions. Associated with the arm is a collar 60 having an internal transverse dimension somewhat smaller than the normal unstressed exterior transverse dimension of the arm 20 when the edges of the arm portions 22 and 24 are in abutment. Accordingly, when the collar 60 is assembled over the outer end of the arm portions 22 and 24 the outer ends of the arm portions are rocked toward each other about the fulcrum point 58, thereby separating the edges of the arm portions 22 and 24 from the fulcrum 58 to the inner or headed end of the arm, this separation being indicated in Figure 2 by the reference numeral 62. Assembly of the collar 60 over the inner ends of arm portions 22 and 24 is not sufficient to apply clamping force to the member 10, and for this purpose a set screw 64 is provided. In order that the set screw 64 shall perform the dual function of preventing accidental movement of the collar 60 off the outer end of the arm 20 and at the same time clamp the member 10 in the arm, one or both of the arm portions 22 and 24 is provided with an opening 66 which receives the inner end of the set screw 64. However, the inner end of the set screw 64 is preferably slightly tapered and the opening 66 is of a dimension such that the inner end of the set screw cannot pass through the opening and engage the member 10 directly. Instead, when the set screw is tightened its tapered inner end enters into the opening 66 sufficiently to provide a rigid interlock preventing movement of the collar off the outer end of the arm and at the same time will flex or displace the outer corner portion of the arm portion into frictional contact with the member 10 to thereby hold it against both rotational and longitudinal movement with respect to the arm. Inasmuch as the clamping action depends upon the flexing of a part of the outer end of the arm portion into contact with the member 10, the opening 66 is preferably provided adjacent a corner of one of the arm portions, as well illustrated in Figures 6, 6A and 7.

When the collar 60 is in the position illustrated in Figure 2, the inner ends of the arm portions 22 and 24 will be separated and the head portions 28 will correspondingly be separated. However, when the head portions are inserted between the ears 30 and 32 they are pressed together and accordingly substantially the entire length of the arm portions 22 and 24 intermediate the fulcrum point 58 and the extreme inner ends of the arm portions are stressed. Since these arm portions are formed of sheet metal there is thus established a resilient force which maintains pressure between the head portions 28 and the ears 30 and 32. Furthermore, since this resilient force is dependent upon the flexed condition of substantially the full length of the arm portions 22 and 24, the condition is one which is maintained through a protracted life and prevents the frictional contact between the head and ears from diminishing with use. As best illustrated in Figure 3, the extreme inner ends of the arm portions 22 and 24 are preferably brought into engagement as indicated by the reference numeral 70.

In the embodiment of the invention specifically described above it was stated that the head portions 28 of the arm portions 22 and 24 were provided with the elongated slots 48 but of course it will be apparent that if preferred the elongated slots may be provided on the ears 30 and 32, as best illustrated in Figure 8. In this figure the ears 30 and 32 are illustrated as provided with elongated slots 72 which extend transversely of the length of the arm portions 22 and 24. It will also be obvious that if desired, elongated slots could be provided in the ears extending in one direction and elongated slots could be provided in the head portions extending in the opposite direction so as to provide for universal adjustment.

Referring now to Figure 9 there is illustrated another embodiment of the invention in which it is contemplated that the arm portions 80 and 82 will be in edge abutment throughout their length as indicated at 84, whereby dependence cannot be placed upon resilience of the arm portions in a direction transverse to their length. However, since the sheet metal from which the arm portions 80 and 82 are formed is resilient, the generally spherical head 86 formed by the abutment between the head portions 88 and 90 is itself slightly compressible and resilient. Thus, when the ears 30 and 32 of the bracket are firmly clamped against the head 86 by the clamping bolt 52 and nut 54, the head is appreciably compressed and due to its resilience friction is thus established which will be effective throughout substantial use and which will permit appreciable wear between the friction surfaces without destroying the frictional contact. Obviously of course, in this case the openings in the head may be elongated as indicated at 92, or similar elongated openings may be provided in the ears 30 and 32, or elongated crossing openings may be provided in both the head portions 88 and 90 and the ears 30 and 32.

Attention is directed to the fact that the mirror supporting means may be mounted at substantially any place on the body of a vehicle due to the fact that the bracket 34 may be secured by self tapping screws 44 to the sheet metal of the body. This avoids the limitation previously inherent in prior constructions that the mirror be carried from the hinge mounting or other fixed point on the vehicle.

Attention is further directed to the fact that a novel and particularly effective arrangement is provided to maintain friction between the mounting ears and the head on the arm, due to the fact that the elongated individual arm portions are bowed by the particular relationship of the collar 60, the relieved end portions 56, and the fulcrum 58. It will also be noted that the bowing of the arm portions resulting from the assembly of the collar 60 over the outer ends of the arm portions does not of itself establish a frictional interlock with respect to the member 10 on the mirror and for this purpose the collar requires a set screw adapted to serve the dual purpose of retaining the set screw on the arm and at the same time applying clamping pressure to the member 10 by deflecting an outer corner of one of the arm portions into frictional engagement with the outer surface of the member 10.

The drawings and the foregoing specification constitute a description of the improved mirror supporting means in such full, clear, concise and exact terms as to enable any person skilled in the art to practice the invention, the scope of which is indicated by the appended claim.

What I claim as my invention is:

A mirror support comprising a head receiving bracket, a tubular arm formed of generally semi-cylindrical sections of resilient material having head portions adapted to be urged apart in operative assembled position, the adjacent edges of said sections being relieved from the outer ends thereof for a substantial but minor portion of their length to fulcrum points constituted by unrelieved edge portions of said sections located in the diametral plane of each section, a tubular extension telescopically received within said arm and having an external transverse dimension substantially less than the internal transverse dimension of said sections when said sections are in unstressed edge abutting relation, a collar surrounding the outer end of said arm and having an internal transverse dimension less than the external transverse dimension of said sections when said sections are in unstressed edge abutting relation thereby to draw the outer ends of said sections toward each other and to rock said sections about said fulcrum points to spread said head portions apart, the internal transverse dimension of said collar being sufficiently large so as to provide for assembly over the outer ends of said sections without cramping the ends of said sections tightly against said extension, one of said sections having an opening adjacent an outer corner portion thereof, and a set screw in said collar having a tapered end received in and bearing against the edge of said opening to clamp the said outer corner portion tightly against said extension.

References Cited in the file of this patent

UNITED STATES PATENTS

| | | |
|---|---|---|
| 822,665 | Higdon | June 5, 1906 |
| 1,442,724 | Hogan | Jan. 16, 1923 |
| 2,134,016 | Zink | Oct. 25, 1938 |
| 2,596,632 | Whitehead | May 13, 1952 |